United States Patent
Inoue et al.

(10) Patent No.: US 11,820,091 B2
(45) Date of Patent: Nov. 21, 2023

(54) TIRE MEMBER FORMING APPARATUS, INSPECTION METHOD FOR TIRE MEMBER, AND MANUFACTURING METHOD FOR TIRE MEMBER

(71) Applicant: Toyo Tire Corporation, Itami (JP)

(72) Inventors: Hiroki Inoue, Itami (JP); Kazuhiro Kobayashi, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 17/980,210

(22) Filed: Nov. 3, 2022

(65) Prior Publication Data

US 2023/0059680 A1  Feb. 23, 2023

Related U.S. Application Data

(62) Division of application No. 16/691,780, filed on Nov. 22, 2019, now Pat. No. 11,518,126.

(30) Foreign Application Priority Data

Nov. 26, 2018  (JP) .................................. 2018-219999

(51) Int. Cl.
*B29D 30/00* (2006.01)
*B29D 30/20* (2006.01)

(52) U.S. Cl.
CPC .......... *B29D 30/0061* (2013.01); *B29D 30/20* (2013.01); *B29D 2030/0066* (2013.01)

(58) Field of Classification Search
CPC .......... B29D 2030/202; B29D 30/0061; B29D 2030/0066; B29D 30/20

(Continued)

(56) References Cited

U.S. PATENT DOCUMENTS

2007/0084541 A1   4/2007 Moriguchi et al.
2007/0137763 A1   6/2007 Burg et al.
(Continued)

FOREIGN PATENT DOCUMENTS

| CN | 103862691 A | 6/2014 |
| JP | 2010/101721 A | 5/2010 |
| JP | 2013-015455 A | 1/2013 |

OTHER PUBLICATIONS

Office Action dated May 24, 2021 issued in counterpart CN application No. 201911147816.6, with English translation. (20 pages).

(Continued)

*Primary Examiner* — Matthew J Daniels
*Assistant Examiner* — Gregory C. Grosso
(74) *Attorney, Agent, or Firm* — WHDA, LLP (57) ABSTRACT

A first forming apparatus includes a forming drum, a forming unit, a conveyance path, and a conveyance unit that conveys the forming drum along the conveyance path. A tire member is formed with tire components wound on the forming drum by the forming unit. The first forming apparatus also includes a measurement unit that performs, on a downstream side of the forming unit in the conveyance path, measurement on the tire components wound on the forming drum while the forming drum is moving through the measurement unit, in a tire radial direction over a width direction of the forming drum, and an inspection unit that performs inspection on winding states of the tire components based on a measurement result due to the measurement unit.

2 Claims, 7 Drawing Sheets

(58) Field of Classification Search
USPC .......................................................... 156/64
See application file for complete search history.

(56) References Cited

U.S. PATENT DOCUMENTS

| | | | |
|---|---|---|---|
| 2013/0009078 A1* | 1/2013 | Inoue | G01B 11/026 250/559.38 |
| 2014/0166189 A1* | 6/2014 | Currie | B29D 30/20 156/394.1 |

OTHER PUBLICATIONS

Notice of Allowance dated Sep. 14, 2022 in U.S. Appl. No. 16/691,780 (8 pages).

* cited by examiner

TIRE MEMBER FORMING APPARATUS, INSPECTION METHOD FOR TIRE MEMBER, AND MANUFACTURING METHOD FOR TIRE MEMBER

CROSS-REFERENCE TO RELATED APPLICATIONS

This application is a Divisional Application of Ser. No. 16/691,780 filed Nov. 22, 2019, and claims priority of Japanese Patent Application No.:2018-219999 filed on Nov. 26, 2018, the content of which is incorporated herein by reference.

BACKGROUND OF THE INVENTION

Technical Field

The present invention relates to a tire member forming apparatus, an inspection method for a tire member, and a manufacturing method for a tire member.

Related Art

A green tire is formed with a carcass band expanded to an outer diameter side and coupled to an inner diameter portion of a tread band. The carcass band is formed with a plurality of tire components, including an inner liner and a carcass ply for example, wound on an outer circumferential portion of a forming drum. Similarly, the tread band is formed with a plurality of tire components, including a belt and a tread rubber member for example, wound on an outer circumferential portion of a forming drum.

For tire members such as a carcass band and a tread band (also referred to as a band body), a winding state such as a tire width direction position and a width of each tire component with respect to the forming drum is inspected. Conventionally, the inspection of the winding state of such a tire member has been mainly performed by a manual sampling inspection. Specifically, at the time of changeover for example, the first article in a lot is cut and measured.

JP 2010-101721 A and JP 2013-15455 A disclose a method for performing total inspection on the winding states of the tire components. In a method disclosed in JP 2010-101721 A, the winding state of a tire component is inspected through scanning in a width direction of the forming drum by means of a one-dimensional laser displacement meter, during a waiting time of a facility during which a worker is performing joint alignment or preparing the next tire component after winding the tire component on a forming drum.

In a method disclosed in JP 2013-15455 A, the winding state of a tire component wound on a forming drum is inspected for a peripheral area of a joint portion of the tire component with a two-dimensional laser sensor or the forming drum which is moved in a drum width direction.

SUMMARY

With the method in JP 2010-101721 A, the inspection is performed during the waiting time of the facility. Thus, if there is no waiting time or if the waiting time is short, the method cannot be applied or can be applied but results in an increase in a cycle time of a forming process. In particular, in the case of the strip winding method, in which a strip is wound spirally, the joint alignment and the preparation of the next strip do not require much time, meaning that the waiting time is short. Thus, the method cannot be applied without increasing the cycle time.

With the method in JP 2013-15455 A, the winding state of the tire component is inspected for the periphery of the joint portion. Thus, the inspection cannot be performed over a wide range in the tire circumference direction. Conventionally, this measurement has been performed as a dedicated measurement step, in a measurement unit, different from a forming unit, into which the measurement target is conveyed. Thus, the measurement needs to be performed as the dedicated measurement step, meaning that the number of steps increases, and that a space for providing the measurement unit is required, resulting in an increase in the facility size.

The present invention provides a tire member forming apparatus, an inspection method for a tire member, and a manufacturing method for a tire member enabling total inspection on the winding states of tire components to be accurately performed without increasing the cycle time and the number of steps.

The present invention provides a tire member forming apparatus including: a forming drum; a plurality of forming units; a conveyance path sequentially connecting the plurality of forming units with each other; and a conveyance unit that conveys the forming drum along the conveyance path. A tire member is formed with tire components sequentially wound on the forming drum by the plurality of forming units. The tire member forming apparatus further includes: a measurement unit that performs, on a downstream side of at least one of the plurality of forming units in the conveyance path, measurement on the tire components wound on the forming drum while the forming drum is moving through the measurement unit, in a tire radial direction over a width direction of the forming drum; and an inspection unit that performs inspection on winding states of the tire components based on a measurement result due to the measurement unit.

According to the present invention, the forming drum passes through the measurement unit provided at a predetermined position of the conveyance path. Thus, the forming drum and the tire component wound thereon are measured in the tire radial direction over the width direction of the forming drum, whereby the winding state of the tire component is inspected. More specifically, the measurement is performed by utilizing the conveyance movement of the forming drum. Thus, the total inspection of the winding state of the tire component in the tire member can be easily performed without providing a dedicated measurement process or performing a sampling inspection.

The measurement unit is disposed at an intermediate portion of the conveyance path using a dead space, whereby the size increase of the tire member forming apparatus is suppressed. Furthermore, since the measurement is performed while the forming drum is being conveyed, the cycle time cannot be prolonged.

Preferably, the measurement unit includes a plurality of sensors separated from each other and arranged along a circumference direction of the forming drum conveyed in a drum width direction through the measurement unit.

According to this configuration, the plurality of sensors are provided at a plurality of positions while being separated from each other along the circumferential direction of the forming drum, whereby the tire component is measured over a wider range in the circumference direction of the forming drum. Thus, the winding state of the tire component in the tire member can be accurately inspected.

Preferably, the plurality of sensors are symmetrically arranged in a radial direction with respect to the forming drum.

With this configuration, the winding state of the tire component can be inspected in a balanced manner in the circumferential direction.

Preferably, the measurement unit is provided on a downstream side of each of the plurality of forming units in the conveyance path.

With this configuration, the measurement unit is provided for each forming unit. Thus, the winding state of each tire component wound in each forming unit can be inspected, without requiring the formed tire member to be cut. Thus, the winding state of the tire component can be inspected with higher accuracy.

Preferably, a display unit is further provided that displays inspection results of the inspection performed by the inspection unit on a plurality of tire members formed, the results being displayed in order of the forming.

According to this configuration, the transition of the winding state of the tire component in the tire member can be checked on the display unit. Based on the transition, possibility of the winding state of the tire component being bad with respect to a predetermined evaluation standard can be more easily predicted in advance. For example, based on the prediction, the winding of the tire component in each forming unit can be adjusted so that the winding state of the tire component is maintained to comply with the predetermined evaluation standard. Thus, an occurrence of a defective product can be prevented.

Another aspect of the present invention provides an inspection method for a tire member formed by winding tire components on a forming drum by each of a plurality of forming units, while the forming drum is being conveyed to the plurality of forming units along a conveyance path sequentially connecting the plurality of forming units, the method comprising:

measuring, on a downstream side of at least one of the plurality of forming units in the conveyance path, the tire components wound on the forming drum while the forming drum is moving through a position where the measuring is performed, in a tire radial direction over a width direction of the forming drum; and inspecting winding states of the tire components based on a result of the measuring.

Preferably, the tire components wound on the forming drum are measured at a plurality of positions separated from each other along a circumference direction of the forming drum conveyed in a drum width direction.

Still another aspect of the present invention provides an inspection method for a tire member including measuring a shape of the tire member formed on a forming drum while the forming drum is being conveyed along a conveyance path.

Still further another aspect of the present invention provides a manufacturing method for a tire member comprising the inspection method for a tire member described above.

According to the present invention, total inspection on the winding states of tire components can be accurately performed without increasing the cycle time and the number of steps.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Embodiments according to the present invention will be described below with reference to the accompanying drawings. Note that the following description is merely an example, and is not intended to limit the present invention, application of the present invention, or use of the present invention. Furthermore, the drawings are schematic, and the ratio among dimensions, for example, may be different from those in the actual case.

Figure 7:
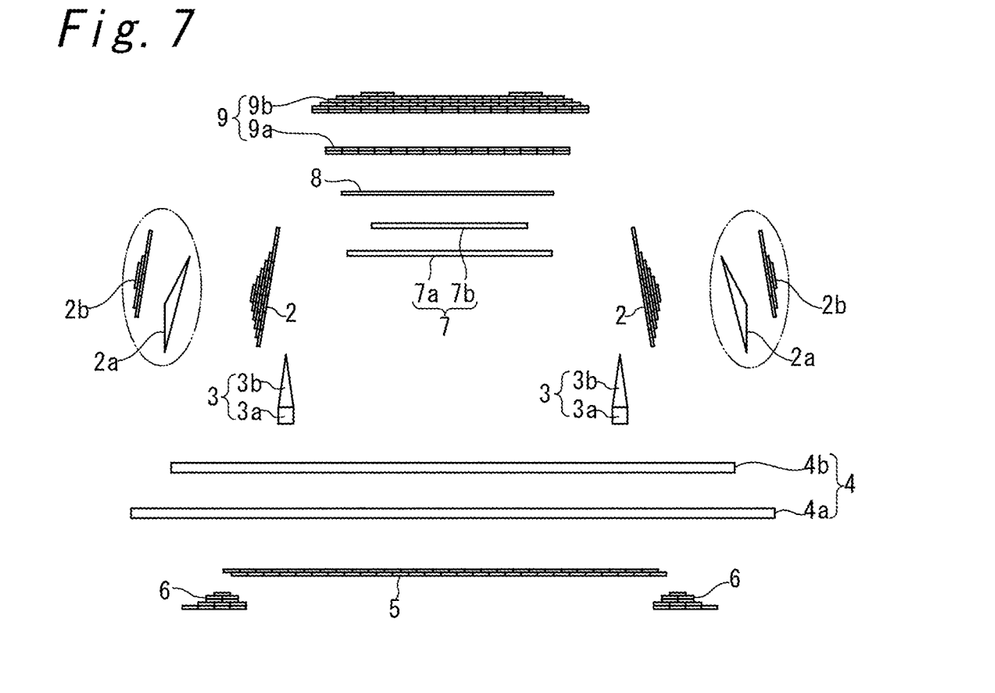
FIG. 7 is a schematic sectional view illustrating an exploded tire component of the green tire in FIG. 8.
Figure 8:
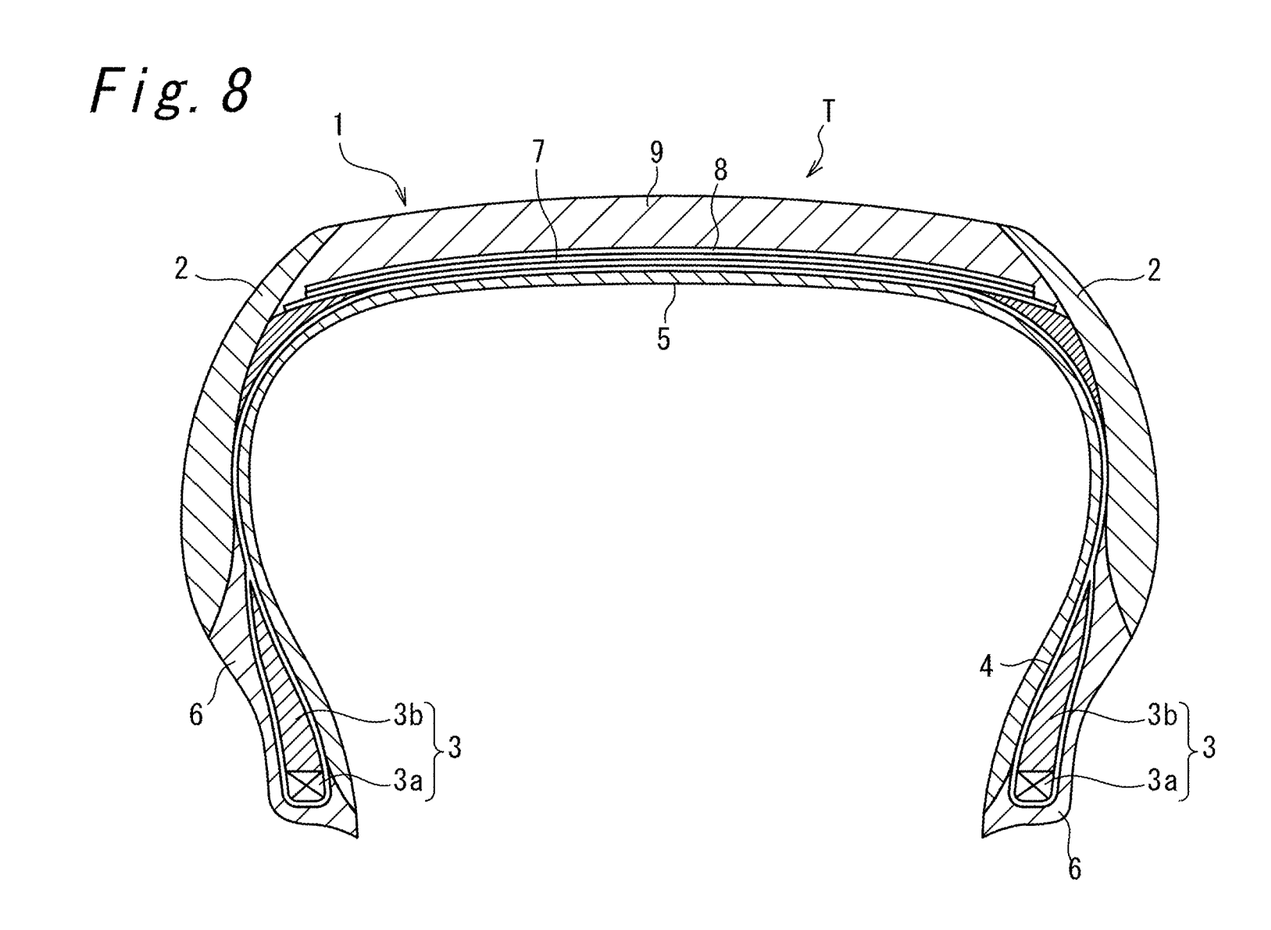
FIG. 8 is a sectional view of the green tire in the meridian direction.

In the present embodiment, a green tire T illustrated in FIG. 8 is formed by combining a plurality of tire components illustrated in FIG. 7 into a cylindrical shape. As illustrated in FIG. 8, the green tire T includes a tread 1, a pair of sidewalls 2 extending inward in a tire radial direction from both ends of the tread 1 in a tire width direction, and a pair of beads 3 positioned at the inner ends of the sidewalls 2 in the tire radial direction.

The tread 1 includes a belt 7, a reinforcing belt 8, and a tread rubber member 9 that are wound in this order from the inner diameter side in the tire radial direction. A carcass ply 4 extends between the pair of beads 3 over the tire inner surface side of the tread 1 and the sidewalls 2. An inner liner 5 is disposed on the tire inner surface side of the carcass ply 4.

The beads 3 each include a bead core 3a and a bead filler 3b that continues from the bead core 3a and extends outward in the tire radial direction. A rubber chafer 6 is disposed around each of the beads 3. The rubber chafer 6 is disposed adjacent to the outer surface side of the carcass ply 4 (the side opposite to the bead 3). The rubber chafer 6 and the carcass ply 4 are folded back from the inner side to the outer side in the tire width direction in the periphery of the bead 3, and is rolled up toward the outer diameter side in the tire radial direction.

The carcass ply 4, the belt 7, and the reinforcing belt 8 are each made by covering a reinforcing cord, working as a core material, with rubber. Components (the tread rubber member 9, the sidewalls 2, the bead fillers 3b, the inner liner 5, and the rubber chafer 6) other than these and other than the bead cores 3a are made of a rubber member.

As illustrated in FIG. 7, the carcass ply 4 includes a first carcass ply 4a and a second carcass ply 4b that are stacked in this order from the inner side in the radial direction. The belt 7 includes a first belt 7a and a second belt 7b that are stacked in this order from the inner side in the radial direction. The tread rubber member 9 includes a tread base 9a and a tread cap 9b stacked in this order from the inner side in the radial direction.

The sidewalls 2 may each be wound and formed using a rubber strip alone as indicated by solid lines in FIG. 7, or may each be formed by using a belt-like rubber member 2a and a rubber strip 2b as indicated by chain lines in FIG. 7. In the present embodiment, the sidewalls 2 are formed by winding a rubber strip after shaping as will be described later.

A cylindrical carcass band is formed by stacking the carcass ply 4 on a rubber layer including the inner liner 5. Then, processes including bead setting and turn up are performed on the carcass band, and thus a cylindrical green case is formed. The green case is expanded toward the outer diameter side, and the resultant green case is assembled on the inner circumferential portion of the tread band to be combined with the tread band, whereby the green tire T is formed.

The forming method for the green tire T according to the present embodiment includes a first forming process for forming a carcass band, a second forming process as the subsequent process for forming a green case, a third forming process for forming a tread band, and a fourth forming process for forming the green tire T by combining the green case with the tread band.

Figure 1:
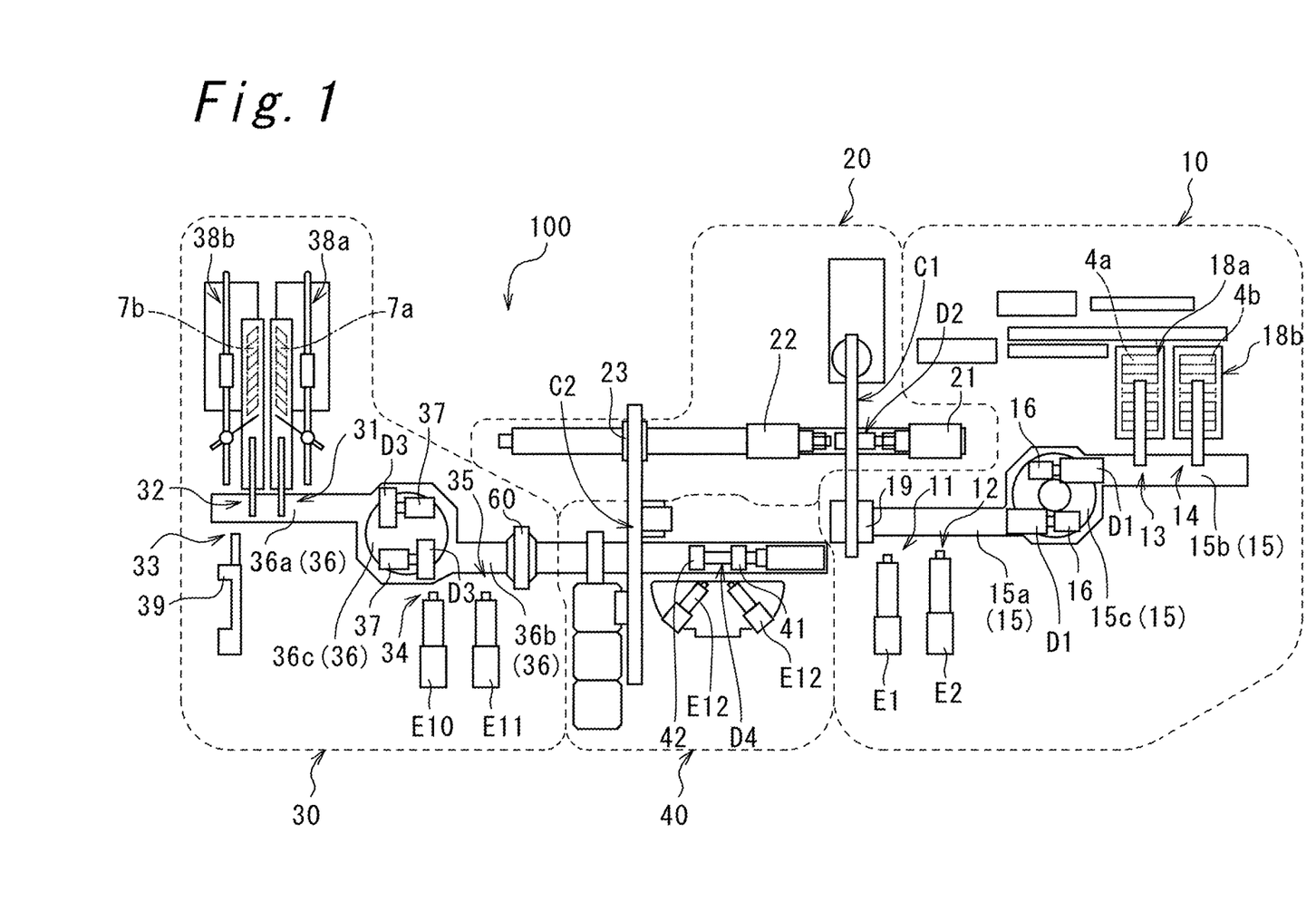
FIG. 1 is a plan view of an entire facility for forming a green tire according to an embodiment of the present invention.

FIG. 1 is a schematic diagram illustrating an entire facility 100 for forming the green tire T according to an embodiment of the present invention. As illustrated in FIG. 1, the facility 100 for forming the green tire T includes first to fourth forming apparatuses 10, 20, 30, and 40 respectively corresponding to the first to the fourth forming processes. The first to the fourth forming apparatuses 10, 20, 30, and 40 respectively include first to fourth forming drums D1 to D4 for the respective forming processes.

The carcass band formed in the first forming apparatus 10 is transferred to the second forming apparatus 20. The green case formed by the second forming apparatus 20 is transferred to the fourth forming apparatus 40. The tread band formed by the third forming apparatus 30 is transferred to the fourth forming apparatus 40. In the fourth forming apparatus 40, the green case and the tread band are combined. The forming apparatuses 10, 20, 30, and 40 concurrently perform the respective forming processes.

The first forming apparatus 10 includes a first forming drum D1, first to fourth carcass band forming units 11 to 14 (hereinafter, referred to as first to fourth forming units) that respectively wind the inner liner 5, the rubber chafer 6, the first carcass ply 4a, and the second carcass ply 4b on the outer circumferential portion of the first forming drum D1, a first conveyance path 15 that sequentially connects these units, and a first conveyance unit 16 that conveys the first forming drum D1 to the first to the fourth forming units 11 to 14 in this order along the first conveyance path 15.

The first forming drum D1 is configured such that the outer circumferential portion can be extended and contracted in the radial direction. The first forming drum D1 is supported by the first conveyance unit 16 to be rotationally drivable. The first conveyance unit 16 conveys the first forming drum D1 in the drum width direction, along the first conveyance path 15. The first conveyance path 15 includes a first half portion 15a located on the upstream side in the conveyance direction, a second half portion 15b located on the downstream side, and a turntable 15c connecting these portions to each other.

The first and the second forming units 11 and 12 for forming the inner liner 5 and the rubber chafer 6 are arranged along the first half portion 15a of the first conveyance path 15, and are respectively provided with extruders E1 and E2 for extruding rubber strips. When the first forming drum D1 arrives at the first or the second forming unit 11 or 12, a rubber strip is extruded to the first forming drum D1 from the corresponding extruder E1 or E2. Then, the drum is rotated while one of the first forming drum D1 and the extruder E1 or E2 are relatively moved in the axial direction with respect to the other, so that the rubber strip is spirally wound. In this manner, each tire component is formed into a predetermined profile.

The third and the fourth forming units 13 and 14 for forming the first carcass ply 4a and the second carcass ply 4b are arranged along the second half portion 15b of the first conveyance path 15, and are respectively provided with a first servicer 18a that supplies the first carcass ply 4a to the third forming unit 13 and a second servicer 18b that supplies the second carcass ply 4b to the fourth forming unit 14. When the first forming drum D1 arrives at the third or the fourth forming unit 13 or 14, the corresponding first or second servicer 18a or 18b supplies the first or the second carcass ply 4a or 4b to the first forming drum D1. The first and second carcass plies 4a and 4b are stacked on the outer diameter sides of the inner liner 5 and the rubber chafer 6 through drum rotation. Thus, a cylindrical carcass band is formed.

The cylindrical carcass band formed in the first forming apparatus 10 is held from the outer circumference side, extracted from the first forming drum D1, and transferred to the subsequent second forming apparatus 20 by a transfer 19 of a band conveyance unit C1.

The second forming apparatus 20 includes a second forming drum D2 and a pair of supporting members 21 and 22 that support the second forming drum D2 in a rotationally drivable manner from both sides in the drum width direction. The supporting members 21 and 22 are provided with a turn-up unit (not illustrated), such as an air bladder, and a setting unit (not illustrated) for the beads 3. The setting unit sets the beads 3 at predetermined positions on both sides of the carcass band, after the carcass band is held on the second forming drum D2. Then, both side portions of the carcass band are folded back to the outer diameter side and the inner side in the drum width direction so that the beads 3 are wrapped by the bladder of the turn-up unit, whereby the green case is formed.

The cylindrical green case formed in the second forming apparatus 20 is held from the outer circumference side, extracted from the second forming drum D2, and transferred to the subsequent fourth forming apparatus 40 by a transfer 23 of a band conveyance unit C2.

The third forming apparatus 30 includes a third forming drum D3, first to fifth tread band forming units 31 to 35 (hereinafter, referred to as first to fifth forming units 31 to 35) that respectively wind the first belt 7a, the second belt 7b, the reinforcing belt 8, the tread base 9a, and the tread cap 9b on an outer circumferential portion of the third forming drum D3, a third conveyance path 36 that sequentially connects these units, and a third conveyance unit 37 that conveys the third forming drum D3 to the first to the fifth forming units 31 to 35 in this order along the third conveyance path 36.

The third forming drum D3 is configured such that the outer circumferential portion can be extended and contracted in the radial direction, and is supported by the third conveyance unit 37 to be rotationally drivable. The third conveyance unit 37 conveys the third forming drum D3 in the drum width direction, along the third conveyance path 36.

The third conveyance path 36 includes a first half portion 36a located on the upstream side in the conveyance direction, a second half portion 36b located on the downstream side, and a turntable 36c connecting these portions to each other.

The first to the third forming units 31 to 33 for respectively forming the first belt 7a, the second belt 7b, and the reinforcing belt 8 are arranged along the first half portion 36a of the third conveyance path 36, and are respectively provided with a first servicer 38a that supplies the first belt 7a to the first forming unit 31, a second servicer 38b that supplies the second belt 7b to the second forming unit 32, and a supplying unit 39 that supplies a spiral tape including a fiber code to the third forming unit 33.

When the third forming drum D3 arrives at the first or second forming unit 31 or 32, the corresponding first or second servicer 38a or 38b supplies the first or the second belt 7a or 7b to the third forming drum D3, and the belt is stacked on the outer circumferential portion of the third forming drum D3 through drum rotation. Then, the third forming drum D3 is conveyed to the third forming unit 33, and the spiral tape supplied from the supplying unit 39 is spirally wound, whereby the reinforcing belt 8 is formed on the belt 7.

The fourth and the fifth forming units 34 and 35 for forming the tread base 9a and the tread cap 9b are arranged along the second half portion 36b of the third conveyance path 36, and are respectively provided with extruders E10 and E11 for extruding rubber strips. When the third forming drum D3 arrives at the fourth or the fifth forming unit 34 or 35, a rubber strip is extruded to the third forming drum D3 from the corresponding extruder E10 or E11. Then, the drum is rotated while one of the third forming drum D3 and the extruder E10 or E11 are relatively moved in the axial direction with respect to the other, so that the rubber strip is spirally wound on the outer diameter side of the belt 7 and the reinforcing belt 8, and the tread base 9a and the tread cap 9b are stacked with a predetermined thickness and width corresponding to the shape of the tread 1, whereby a cylindrical tread band is formed.

The cylindrical tread band formed in the third forming apparatus 30 is held from an outer circumferential portion, extracted from the third forming drum D3, and transferred to the fourth forming apparatus 40 by a transfer 60.

The fourth forming apparatus 40 includes a fourth forming drum D4. The fourth forming drum D4 includes a pair of supporting members 41 and 42 that hold the green case from the inner diameter sides of the pair of left and right beads 3. The pair of supporting members 41 and 42 are provided to be movable close to and away from each other in the drum axis direction, and include a medium supplying unit (not illustrated) that fills the inner side of the green case held at the outer circumferential portion, with an expansion medium (compressed air for example).

After the tread band is located on the outer circumference side of the green case while being coaxially arranged with the green case through the relative movement between the fourth forming drum D4 and the transfer 60, the expansion medium is supplied to the inner side of the green case while the pair of supporting members 41 and 42 move close to each other. As a result, the green case expands in a toroidal shape in the outer diameter side and adheres to the inner circumferential portion of the tread band, whereby the green case and the tread band are combined with each other so that a combined body is formed.

Furthermore, the fourth forming apparatus 40 is provided with extruders E12 and E12 for extruding rubber strips for forming the sidewalls (2 in FIG. 7) on both side portions of the combined body. With these extruders E12 and E12, rubber strips for the sidewalls 2 are extruded and supplied to both side portions of the combined body, and the sidewalls 2 are attached through drum rotation, whereby the green tire T is completed.

In the present embodiment, the first forming apparatus 10 further includes a winding state inspection unit 50 (hereinafter, referred to as an inspection unit). The inspection unit 50 performs inspection for the winding state of a plurality of tire components wound on the first forming drum D1, more specifically, performs inspection on a tire member formed by winding the tire components.

Figure 2:
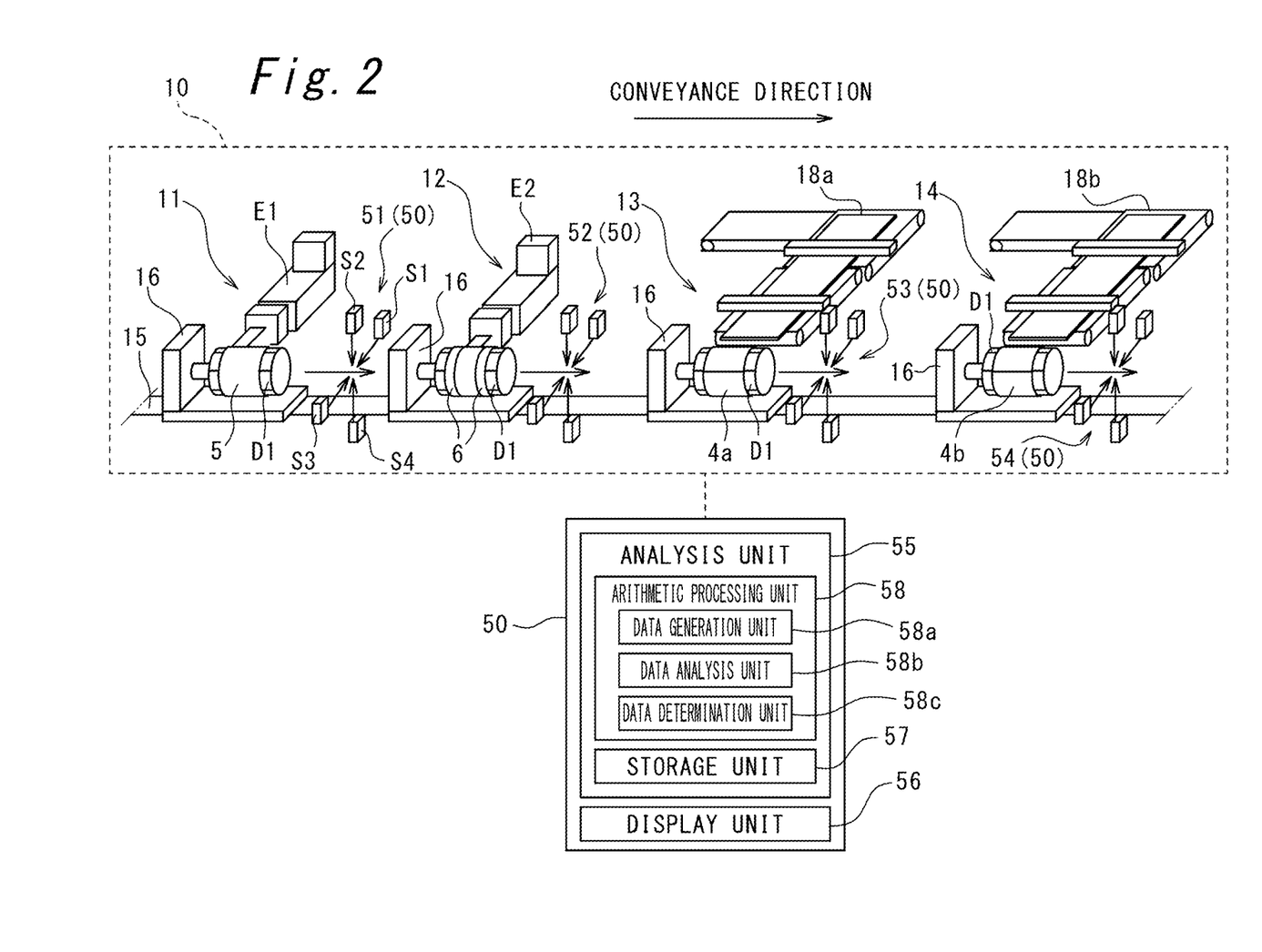
FIG. 2 is a perspective view illustrating a schematic configuration of a carcass band forming stage.

FIG. 2 is a perspective view schematically illustrating the first forming apparatus 10, with the first conveyance path 15 illustrated in a simplified manner. Specifically, in FIG. 2, the turntable 15c is omitted so that the first half portion 15a and the second half portion 15b are linearly arranged. Furthermore, in FIG. 2, the first and the second extruders E1 and E2 as well as the first and the second servicers 18a and 18b are on the same side with respect to the width direction of the first conveyance path 15, unlike in FIG. 1.

As illustrated in FIG. 2, the inspection unit 50 includes first to fourth measurement units 51 to 54 that are respectively provided on the downstream side of the first to the fourth forming units 11 to 14 in the conveyance direction on the first conveyance path 15, an analysis unit 55 that analyzes the winding state of the tire components based on a measurement result measured by the measurement units 51 to 54, and a display unit 56 that displays an analysis result analyzed by the analysis unit 55. In other words, each of the first to the fourth measurement units 51 to 54 is located at an intermediate portion of the conveyance path to the subsequent forming unit, and measures the tire components wound in the preceding forming unit.

Specifically, the first measurement unit 51 is provided between the first forming unit 11 and the second forming unit 12 in the first conveyance path 15. The second measurement unit 52 is provided between the second forming unit 12 and the third forming unit 13 in the first conveyance path 15. The third measurement unit 53 is provided between the third forming unit 13 and the fourth forming unit 14 in the first conveyance path 15. The fourth measurement unit 54 is provided on the downstream side of the fourth forming unit 14 in the first conveyance path 15.

The first measurement unit 51 performs the measurement on the inner liner 5 wound on the first forming drum D1 in the first forming unit 11. The second measurement unit 52 performs the measurement on the rubber chafer 6 further wound on the first forming drum D1 in the second forming unit 12. The third measurement unit 53 performs the measurement on the first carcass ply 4a further wound on the first forming drum D1 in the third forming unit 13. The fourth measurement unit 54 performs the measurement on the second carcass ply 4b further wound on the first forming drum D1 in the fourth forming unit 14.

Figure 3:
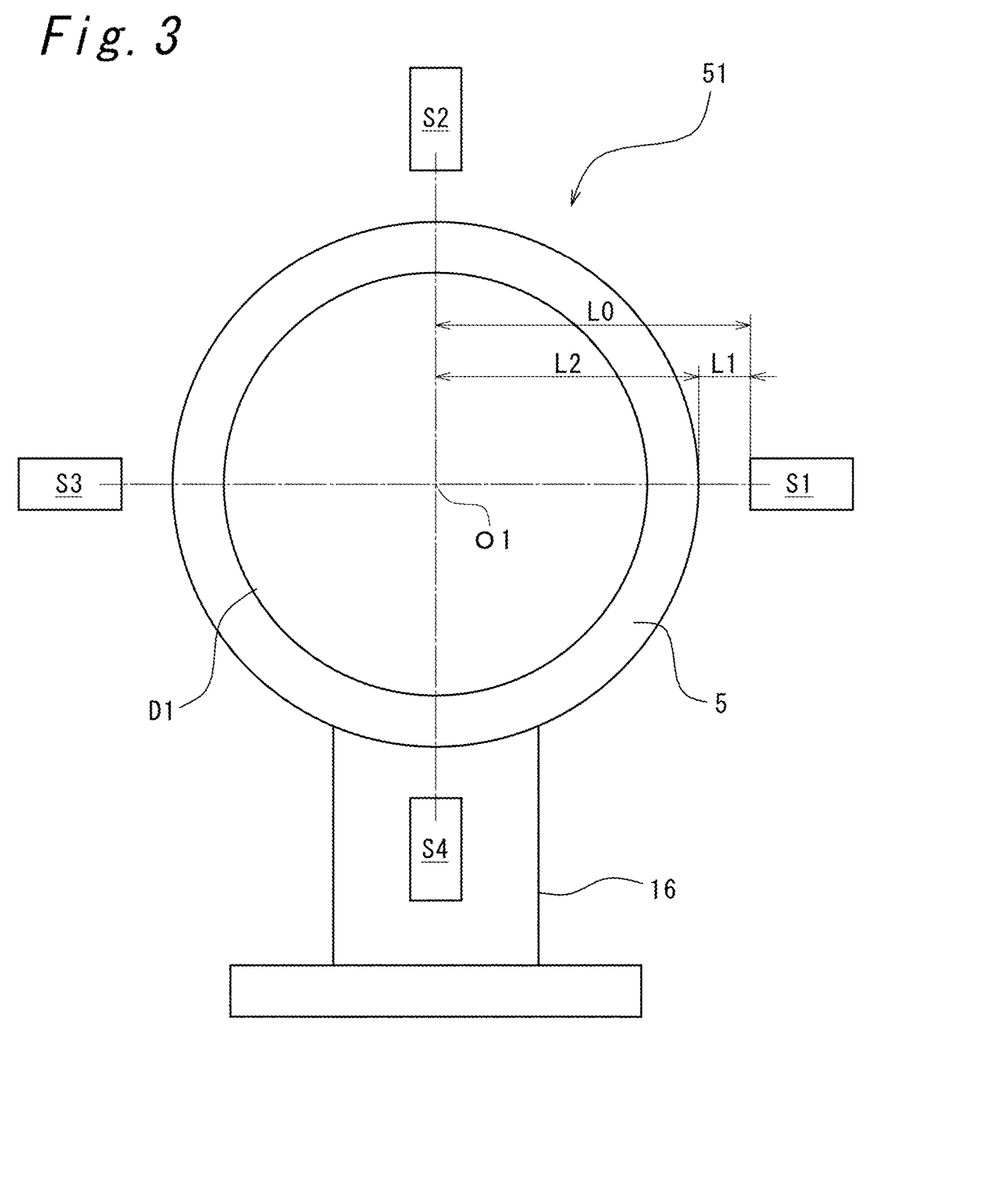
FIG. 3 is a side view illustrating measurement in a measurement unit.

FIG. 3 is a schematic view of the first measurement unit 51 as viewed in the conveyance direction. The first measurement unit 51 will be described in detail further with reference to FIG. 3. Note that the second to the fourth measurement units 52 to 54 are similarly configured. As illustrated in FIG. 3, the first measurement unit 51 includes first to fourth laser sensors S1 to S4.

Each of the laser sensors S1 to S4 is a one-dimensional laser displacement meter, and measures the distance to a measurement target portion by irradiating the measurement target portion with laser light and receiving the reflected light. The first to fourth laser sensors S1 to S4 each measure the distance to a measurement target object, when the measurement target object is within a predetermined distance from the sensor. Specifically, the first to the fourth laser sensors S1 to S4 are positioned while being separated from the first forming drum D1, passing through the sensors, by the predetermined distance or less in the radial direction.

The first to fourth laser sensors S1 to S4 are annularly arranged at a plurality of positions along the outer circumferential portion of the first forming drum D1, that is, at a plurality of angular positions in an angular range that is 180 degrees or more over the outer circumference of the first forming drum D1 that passes through the sensors. In the present embodiment, the first to the fourth laser sensors S1 to S4 are positioned while being separated from one another at an interval of approximately 90 degrees along the outer circumference of the first forming drum D1.

The first to the fourth laser sensors S1 to S4 measure the distance to the first forming drum D1 and the tire components wound thereon as the first forming drum D1 moves to be conveyed in the first measurement unit 51, over the drum width direction. The measurement results obtained by the laser sensors S1 to S4 are input to the analysis unit 55.

The first laser sensor S1 and the third sensor S3 are provided in a pair so as to face each other across the first forming drum D1 in the radial direction with the irradiation and light receiving directions oriented in the horizontal direction. The second laser sensor S2 and the fourth laser sensor S4 are provided in a pair so as to face each other across the first forming drum D1 in the radial direction with the irradiation and light receiving directions oriented in the vertical direction.

As illustrated in FIG. 2, the analysis unit 55 includes a storage unit 57 such as a hard disk, an arithmetic processing unit (central processing unit (CPU)) 58, a memory, a known computer including an input/output device, and software installed in the computer.

The storage unit 57 stores reference data for the tire component wound on the first forming drum D1 in each of the first to the fourth forming units 11 to 14. The reference data for each of the tire components includes reference values and tolerable differences (threshold) from each of the reference values of the tire component wound on the first forming drum D1 based on a design median value. The reference values include a position in the drum width direction, a length in the width direction, a meandering amount, a thickness, and the like for the tire component wound with the design median value. Thus, the storage unit 57 stores the reference data for each of the inner liner 5, the rubber chafer 6, and the first and second carcass plies 4a and 4b.

The arithmetic processing unit 58 includes a data generation unit 58a that generates pieces of profile data P11 to P14 based on the respective measurement results due to the first to fourth laser sensors S1 to S4, a data analysis unit 58b that analyzes the winding state of the tire component based on the pieces of profile data P11 to P14, and a data determination unit 58c that determines quality of the winding state of the tire component based on the analysis result.

Figure 4A:
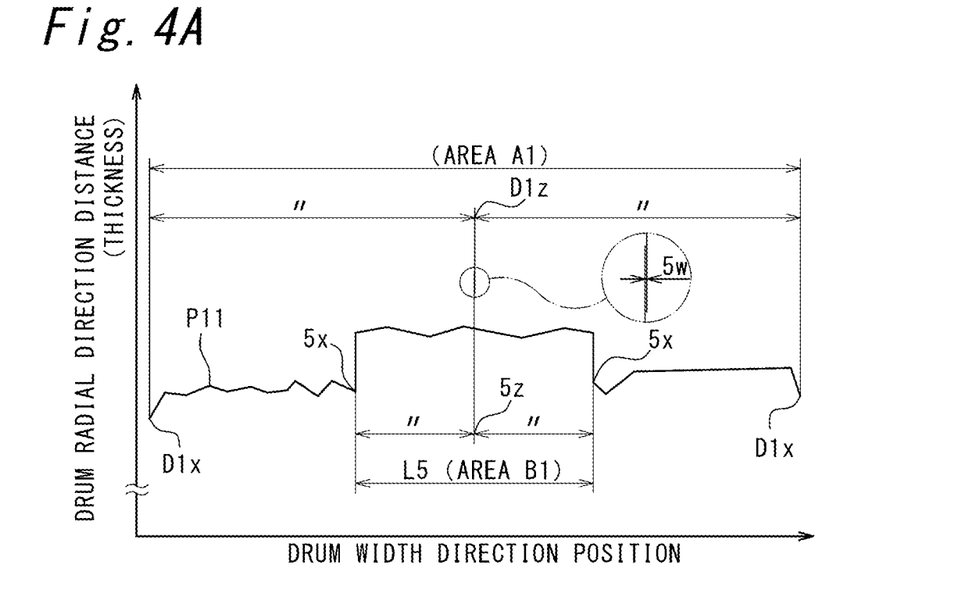
FIG. 4A is a graph illustrating an example of profile data.

FIG. 4A illustrates the profile data P11, as a representative example, generated by the data generation unit 58a based on the measurement result obtained by the first laser sensor S1. As illustrated in FIG. 4A, the profile data P11 is two-dimensional data represented by a graph with the horizontal axis representing the drum width direction position of the measurement target object in the drum width direction, and the vertical axis representing the distance between a drum axis O1 and a measurement target surface.

Here, the first forming drum D1 is conveyed by the first conveyance unit 16 so as to pass through the first to the fourth measurement units 51 to 54 at a predetermined constant speed. Thus, in the profile data P11, the position in the horizontal axis direction (drum width direction position) is calculated by multiplying the constant speed by the measurement time. Referring also to FIG. 3, in the profile data P11, for a distance L2 (thickness) between the drum axis 01 and the measurement target surface is calculated, a position in the vertical axis direction is calculated as a value obtained by subtracting a distance L1 measured by each of the sensors S1 to S4 from a distance L0 between the drum axis O1 and each of the sensors S1 to S4.

As illustrated in FIG. 4A, an area A1 where the measurement result is illustrated indicates a portion where the measurement target object, that is, the first forming drum D1 conveyed is detected by the first laser sensor S1.

The data analysis unit 58b detects both ends in the horizontal axis direction based on the region A1 in the profile data P11 generated by the data generation unit 58a, as a pair of width direction end portions D1x of the first forming drum D1, and calculates the center position between these in the drum width direction as a drum center position D1z of the first forming drum D1.

Furthermore, the data analysis unit 58b detects, based on the profile data P11, an area B1 as an area where the tire component wound on the first forming drum D1, that is, the inner liner 5 exists. The area B1 is an area, in the area A1, where the distance (thickness) is increased over the predetermined threshold. The predetermined threshold is set as a value with which the inner liner 5 having a predetermined thickness can be detected. For example, the predetermined threshold is set to be an allowable lower limit value of the thickness of the inner liner 5.

The data analysis unit 58b detects both end portions of the area B1 in the horizontal axis direction as a pair of width direction end portions 5x of the inner liner 5, and calculates the center position between these in the drum width direction as a width direction center position 5z of the inner liner 5. Furthermore, the data analysis unit 58b calculates an off-center 5w that is a difference between the width direction center position 5z of the inner liner 5 and the width direction center position D1z of the first forming drum D1. Furthermore, the data analysis unit 58b calculates the dimension of the area B1 in the horizontal axis direction as a width direction dimension L5 of the inner liner 5.

As described above, in the first measurement unit 51, the pieces of profile data P11 to P14 are generated based on the measurement results obtained by the first to fourth laser sensors S1 to S4. Then, the four pairs of the width direction end portions 5x of the inner liner 5, as well as the four width direction center positions 5z and width direction dimensions L5 respectively corresponding to the pieces of profile data P11 to P14 are calculated. The data analysis unit 58b calculates a variation (for example, the difference between the maximum value and the minimum value) of the four width direction end portions 5x of the inner liner 5 as a meandering amount 5y.

The data determination unit 58c compares the reference data stored in the storage unit 57 with the off-center 5w, the width direction dimension L5, and the meandering amount 5y of the inner liner 5 calculated by the data analysis unit 58b, to calculate the difference from the reference data. Next, the data determination unit 58c determines quality of the winding state of the inner liner 5 based on whether the difference from the reference data is equal to or less than a predetermined threshold value. The determination result obtained by the data determination unit 58c is displayed on the display unit 56.

Figure 5:
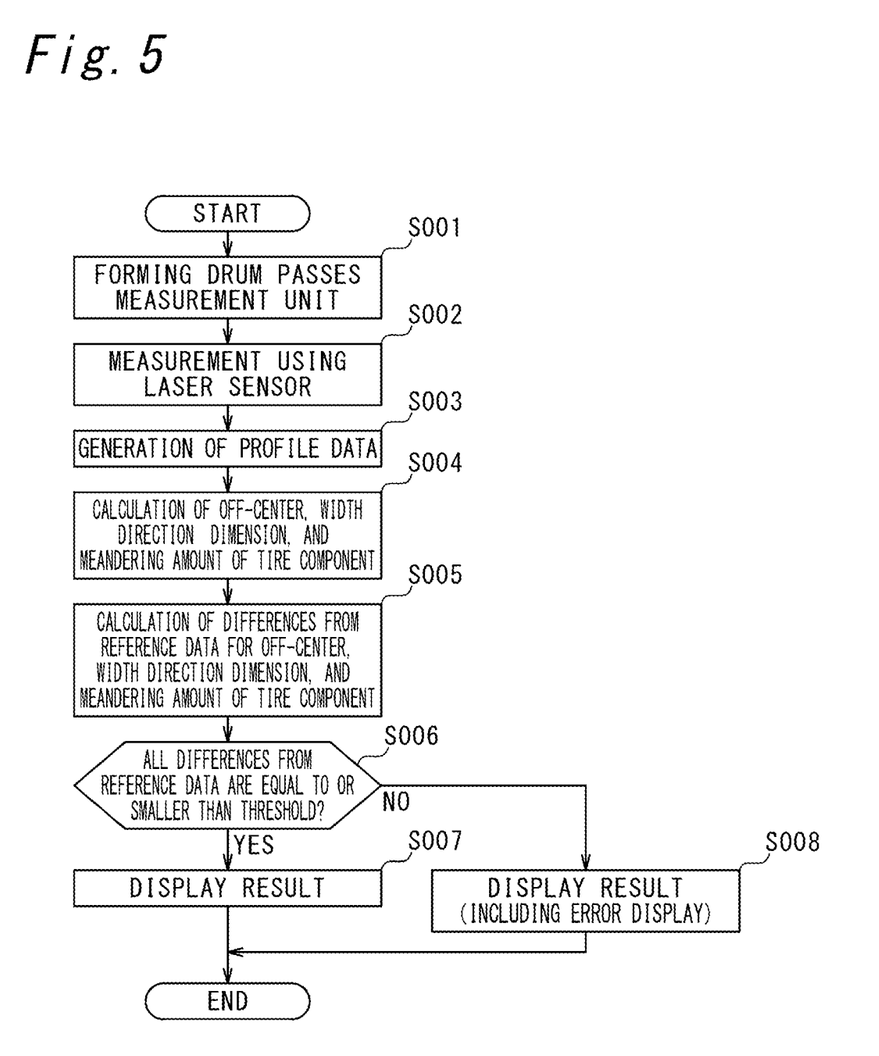
FIG. 5 is a flowchart illustrating a flow of inspection of a winding state of a tire component.

Next, a flow of the inspection of the winding state of the tire component due to the inspection unit 50 will be described with reference to a flowchart illustrated in FIG. 5.

First of all, the first forming drum D1 on which the inner liner 5 is wound in the first forming unit 11 is conveyed by the first conveyance unit 16 along the first conveyance path 15 toward the second forming unit 12, and passes through the first measurement unit 51 (step S001). In this process, the first forming drum D1 passing through the first measurement unit 51 is measured in the radial direction by the first to fourth laser sensors S1 to S4 over the drum width direction (step S002).

Next, the data generation unit 58a generates the pieces of profile data P11 to P14 based on the measurement results obtained by the first to fourth laser sensors S1 to S4 (step S003).

Next, the data analysis unit 58b calculates the off-center 5w, the width direction dimension L5, and the meandering amount 5y of the inner liner 5 based on the pieces of profile data P11 to P14 (step S004). The off-center 5w and the width direction dimension L5 are calculated for each of the first to the fourth laser sensors S1 to S4. On the other hand, only a single meandering amount 5y is calculated for the first to the fourth laser sensors S1 to S4.

Next, the data determination unit 58c calculates the differences from the reference data by comparing the off-center 5w, the width direction dimension L5, and the meandering amount 5y of the inner liner 5 with the reference data stored in the storage unit 57 (step S005). Then, the data determination unit 58c determines whether the differences are equal to or smaller than the predetermined threshold (step S006).

When the differences from the reference data are equal to or smaller than the predetermined threshold, the data determination unit 58c determines that the winding state of the inner liner 5 is good, and causes the display unit 56 to display the pieces of profile data P11 to P14 as well as the analysis result including the off-center 5w, the width direction dimension L5, and the meandering amount 5y (step S007).

When the differences from the reference data exceed the predetermined threshold, the data determination unit 58c determines that the winding state of the inner liner 5 is bad, and causes the display unit 56 to display the pieces of profile data P11 to P14 and the analysis result together with an error (step S008). With the error displayed on the display unit 56, the operator can be notified of the fact that the winding state of the inner liner 5 is bad. As a result, the carcass band with the bad winding state of the tire component can be prevented from being distributed.

Thereafter, based on the measurement results obtained by the second to the fourth measurement units 52 to 54, the winding states of the tire components wound in the preceding second to fourth forming units 12 to 14 are similarly inspected. The tire component wound by the preceding forming unit is detected based on the distance (thickness) in the drum radial direction.

Figure 4B:
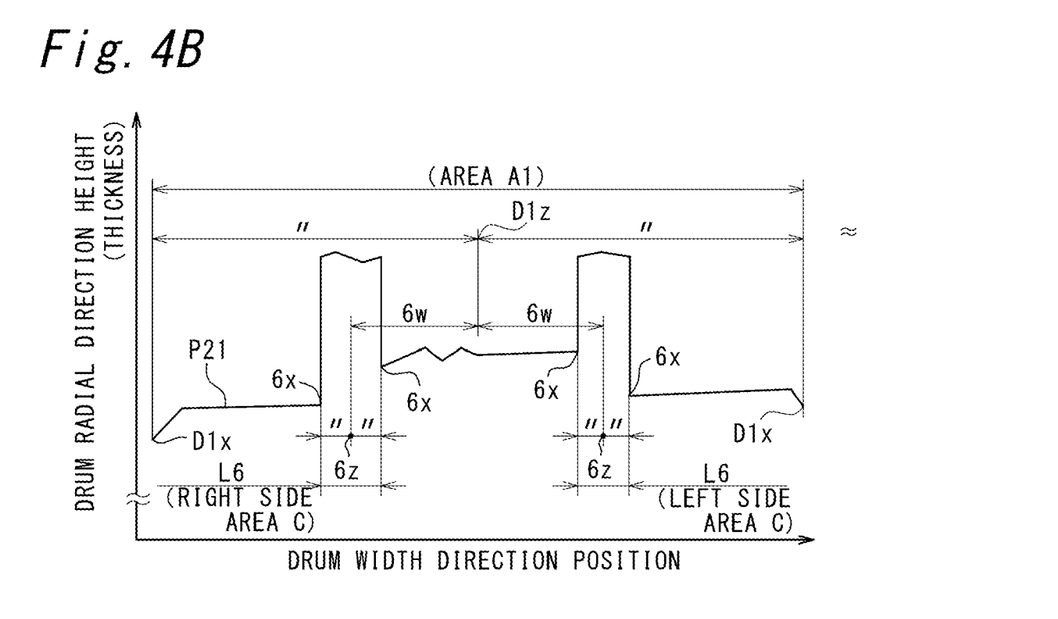
FIG. 4B is a graph illustrating another example of profile data.

Alternatively, the tire component may be detected as a difference from the profile data generated by the preceding measurement unit, specifically, as a portion with an increased thickness. This will be described in detail with the second measurement unit 52 used as an example. Specifically, the rubber chafer 6 further wound by the second forming unit 12 at the preceding position is detected as an area C with pieces of profile data P21 to P24 (the profile data P21 is illustrated in FIG. 4B), generated based on the measurement result obtained by the second measurement unit 52, the difference (increase) of which from the pieces of profile data P11 to P14 based on the measurement result obtained by the first measurement unit 51 exceeds the predetermined threshold. Since the pair of left and right rubber chafers 6 are wound, the area C is detected for a pair of left and right regions. Then, the winding state (an off-center 6w, a width direction dimension L6, and a meandering amount 6y) is analyzed for each of the rubber chafers 6.

The forming facility for the green tire described above can provide the following effects.

(1) In the first forming apparatus 10, the first forming drum D1 passes through the first to the fourth measurement units 51 to 54 provided on the first conveyance path 15. Thus, the first forming drum D1 and the tire component wound thereon (the inner liner 5, the rubber chafer 6, and the carcass ply 4) are measured in the tire radial direction over the width direction of the first forming drum D1, whereby the winding state of the tire components are inspected. More specifically, the measurement is performed by utilizing the conveyance movement of the first forming drum D1. Thus, the total inspection of the winding state of the tire component in the carcass band can be easily performed without providing a dedicated measurement process or performing a sampling inspection.

(2) The first to the fourth measurement units 51 to 54 are disposed at intermediate portions of the first conveyance path 15 using a dead space, whereby the size increase of the first forming apparatus 10 is suppressed. Furthermore, since the measurement is performed while the first forming drum D1 is being conveyed, the cycle time can not be prolonged.

(3) Since the first to the fourth laser sensors S1 to S4 are provided at a plurality of positions along the circumferential direction of the first forming drum D1, the tire component is measured over a wider range in the circumference direction of the first forming drum D1. Thus, for example, the meandering amount of the tire component can be calculated, whereby the winding state of the tire component in the carcass band can be accurately inspected. Furthermore, the measurement can be performed at a plurality of locations in the circumferential direction without rotating the first forming drum D1, whereby the first forming apparatus 10 can have a simple configuration.

(4) The first laser sensor S1 and the third laser sensor S3 are provided symmetrically in the vertical direction (radial direction) across the first forming drum D1, and the second laser sensor S2 and the third laser sensor S4 are provided symmetrically in the horizontal direction (radial direction) across the first forming drum D1. Thus, the winding state of the tire component can be inspected in a balanced manner in the circumferential direction.

(5) The first to fourth measurement units 51 to 54 are respectively provided on the downstream side of the first to the fourth forming units 11 to 14 in the first conveyance path 15. Thus, the winding state of each tire component can be inspected without cutting the tire member wound on the first forming drum D1 in each of the forming units 11 to 14. Thus, the winding state of the tire components can be inspected with higher accuracy.

Figure 6:
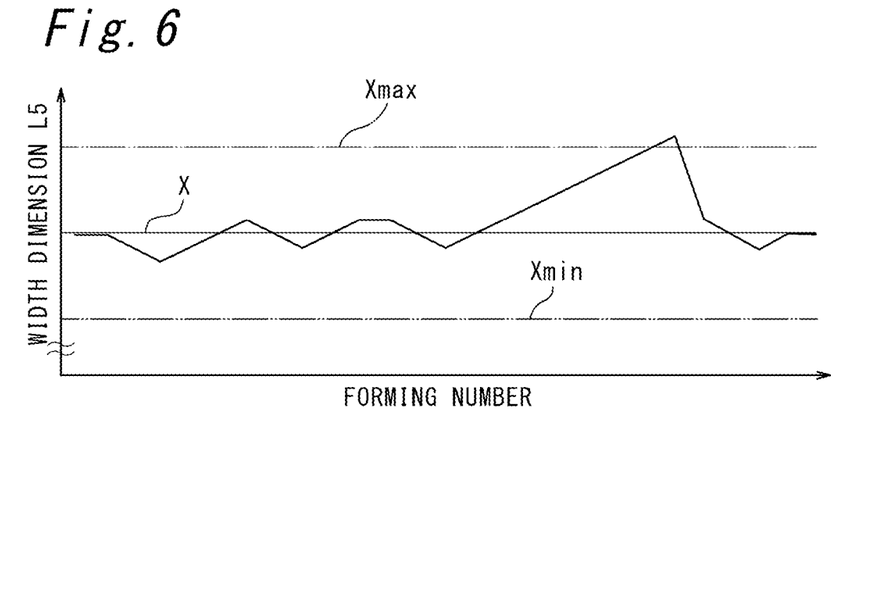
FIG. 6 is a diagram illustrating an example of transition of measurement results indicated on a display unit.

In the above described embodiment, the pieces of profile data P11 to P14 and the analysis result obtained by the winding state of the tire component are displayed on the display unit 56. Furthermore, the transition of the analysis result may be displayed. For example, as illustrated in FIG. 6, the width direction dimensions L5 of the inner liners 5 of the respective formed products may be sequentially plotted into a graph to display the transition of the width direction dimension L5. Furthermore, a reference line X indicating a reference value of the width direction dimension L5 and allowable value lines Xmax and Xmin respectively indicating the upper limit value and the lower limit value based on the threshold may be displayed.

Thus, the transition of the width direction dimension L5 can be confirmed. Based on the transition, whether the winding state of the inner liner 5 becomes bad can be more easily predicted based on the allowable value lines Xmax and Xmin. For example, based on the prediction, the winding of the tire component in the relevant forming unit can be adjusted so that the winding state of the tire component is maintained between the allowable value lines Xmax and Xmin. Thus, a defective product can be prevented from being formed.

In the above embodiment, the case where the first forming apparatus 10 is provided with the inspection unit 50 is described as an example. However, the present invention is not limited thereto. Specifically, the inspection unit 50 can be applied to the tire member forming apparatuses in which the tire component is wound, and can be applied to the third forming apparatus 30.

In this case, the profile of the tread 1 may be inspected by the inspection unit 50. Specifically, the profile of the tread 1 is calculated by calculating the thickness of the tread 1 based on the pieces of profile data P11 to P14 generated by the data generation unit 58a and comparing the thickness with the reference value of the thickness stored in the storage unit 57.

Moreover, in the embodiment described above, when the winding state of the tire component is bad, the display unit 56 displays an error. In addition, the relevant forming apparatus may be stopped. Thus, the defective is prevented from being formed.

Moreover, in the embodiment described above, the one-dimensional laser sensors are used as the sensors. However, the present invention is not limited thereto. Specifically, a two-dimensional laser sensor may be used as the sensor. When the two-dimensional laser sensor is used, the irradiation part and the light receiving part of the two-dimensional laser sensor are arranged along the circumferential direction of the forming drum. Thus, profile data in a predetermined width region in the drum circumferential direction can be generated. Thus, the winding state of the tire component can be inspected in a wider area.

Furthermore, a camera may be used instead of the sensor. In this case, an image of the forming drum, passing through the measurement unit, may be captured over the drum width direction, end portions of the tire component in the drum width direction may be detected by analyzing the image or the movie, and the winding state such as the off center, the width direction dimension, and the meandering amount may be analyzed based on the end portions.

The present invention is not limited to the configuration described in the embodiment, and may be modified in various ways.

What is claimed is:

1. An inspection method for a tire member formed by winding tire components on a forming drum by each of a plurality of forming units, while the forming drum is being conveyed to the plurality of forming units along a conveyance path sequentially connecting the plurality of forming units, the method comprising:
   measuring, on a downstream side of at least one of the plurality of forming units in the conveyance path, the tire components wound on the forming drum while the forming drum is not rotating and is moving, in a width direction of the forming drum, through a position where the measuring is performed, the measuring being done in a tire radial direction; and
   inspecting winding states of the tire components based on a result of the measuring,
   wherein the tire components wound on the forming drum are measured simultaneously at a plurality of positions separated from each other along a circumference direction of the forming drum using a pair of one-dimensional laser displacement meters which are symmetrically arranged in a radial direction with respect to the forming drum.

2. A manufacturing method for a tire member comprising the inspection method for a tire member according to claim 1.

* * * * *